Acetate PM-3 and Cellulose Propionate, Formula No. 28,251, each plasticized with Santicizer E-15 (ethyl phthalyl glycolate) in the ratio of one part of plasticizer to 4 parts of cellulose ester yielded a film that was non-flexible at −50° C. The same results were obtained by the addition of Santicizer M-17 (methyl phthalyl ethyl glycolate) in the same proportions.

The methyl ester of pinonic acid (and the "Reformatsky" derivatives thereof) may also be prepared from "crude sulfate turpentine" as a starting material, as is more fully set forth in my copending application Serial No. 185,139, "Terpene Carboxylic Acid Esters," filed September 15, 1950. Crude sulfate turpentine is the by-product obtained by the condensation of the releases gases of the pulp digester used in the sulfate pulp process, a process well known to the art under various names, e. g. the Kraft process, and described e. g., in Rogers' Industrial Chemistry, vol. 2, page 1418, 1942. Crude sulfate turpentine contains approximately 70% alpha and 30% beta pinene, together with a small but disagreeably smelling methyl and other mercaptans and similar sulfur compounds. As stated in my above-identified copending application Serial No. 185,139, crude sulfate turpentine is converted, in accordance with my invention, by first reacting it with an oxidizing agent, then removing a preponderant proportion of the sulfur compounds (which at that stage separate easily), and finally acidifying, extracting and fractionating the residue. The crude pinonic acid (or rather mixture of isomeric pinonic acids) resulting from this process is characterized by a positive test for sulfur; however, these sulfur impurities still remaining, are now present in oxidized form, odorless and otherwise harmless.

In addition to the usefulness of the pinonic acid derivatives as disclosed herein, as plasticizers for cellulose esters and resins of the type obtained by the polymerization of a monomer containing a polymerizable $CH_2:CH-$ group (such as for instance polystyrene or polyvinyl butyral), they can also serve as plasticizers for natural and synthetic rubbers, as pour point depressants for low temperature lubricants, brake fluids, and leather greases. Their desirable fungistatic properties can be utilized in adhesive compositions, as fixatives in soaps and lotions, as pigment carriers in paints, in protective coatings and lacquers, and other applications.

It will be understood that the various examples given herein are illustrative of specific instances of the production and utilization of terpene carboxylic acid esters in accordance with the present invention, and are not intended to limit the scope of my invention to the particular details set forth in such examples. Inasmuch as variations and modifications within the spirit of my invention will be readily apparent to the expert, I intend to encompass such variations and modifications within the scope of my appended claims.

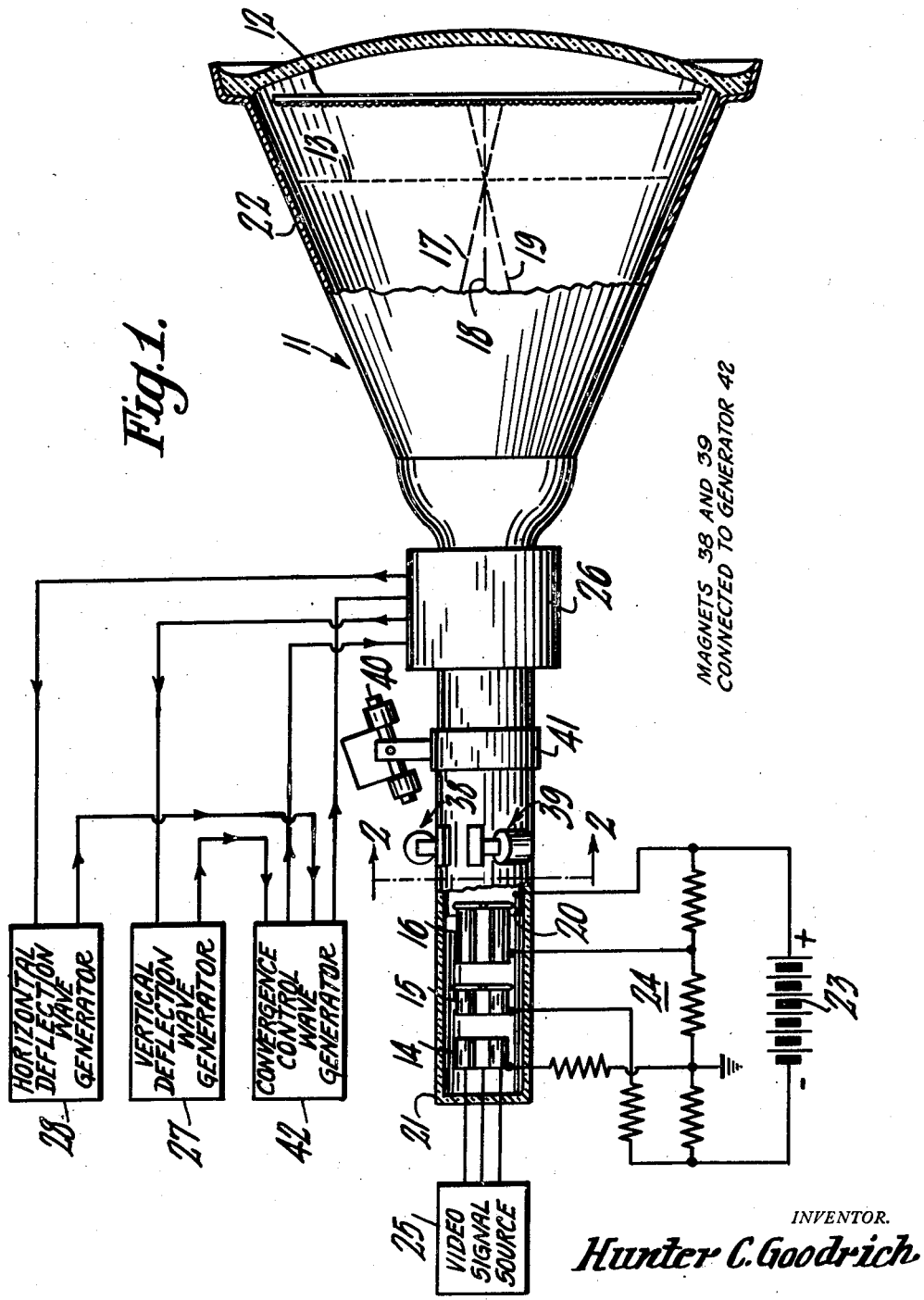

I claim:

1. A process of combating fungi, comprising applying to the area of expected fungus growth as a fungus resisting compound an ester having the structural formula

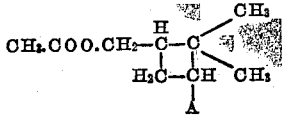

wherein A is a member of the group consisting of —CO.CH₃ and

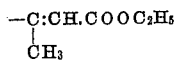

2. A process of combating fungi comprising applying as a fungus resisting compound a lower alkyl diester of 1-methyl homodehydroethylene pinic acid to the area of expected fungus growth.

3. A process of combating fungi comprising applying as a fungus resisting compound the methyl ethyl diester of 1-methyl homodehydroethylene pinic acid to the area of expected fungus growth.

4. A process of combating fungi comprising applying as a fungus resisting compound the methyl ester of pinonic acid to the area of expected fungus growth.

5. A fungus-resisting composition of matter comprising a lower alkanoyl cellulose ester, and as a plasticizer and fungistatic agent therefor an ester having a structural formula

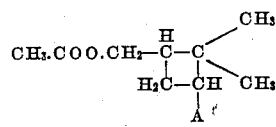

wherein A is a member of the group consisting of —CO.CH₃ and

6. The invention according to claim 5, wherein said cellulose ester is cellulose acetate.

7. The invention according to claim 5, wherein said cellulose ester is cellulose propionate.

8. A fungus-resisting composition of matter comprising a lower alkanoyl cellulose ester, and as a plasticizer and fungistatic agent therefor the methyl ester of pinonic acid.

9. A fungus-resisting composition of matter comprising a lower alkanoyl cellulose ester, and as a plasticizer and fungistatic agent therefor a lower alkyl diester of 1-methyl homodehydroethylene pinic acid.

References Cited in the file of this patent

UNITED STATES PATENTS

| Number | Name | Date |
|---|---|---|
| 881,827 | Rouxeville | Mar. 10, 1908 |
| 1,752,693 | Ramage | Apr. 1, 1930 |
| 1,963,955 | Cleveland | June 26, 1934 |
| 2,398,492 | Bradshaw et al. | Apr. 16, 1946 |
| 2,429,603 | Borglin et al. | Oct. 28, 1947 |
| 2,450,706 | Zeiss | Oct. 5, 1948 |

OTHER REFERENCES

"The Chemistry of Insecticides and Fungicides"—Frear (1948), page 154.

Beilstein, Vierte auflage, 1st supplement—vol. 10, pages 297–8 (1932).

Komppa Am. Acad., Sci. Fennicase A 59 1, 3—23 (1943), Chemical Abstracts 41, pages 425–6.